No. 620,794. Patented Mar. 7, 1899.
D. MORGAN.
WASHING MACHINE.
(Application filed Aug. 25, 1898.)
(No Model.)
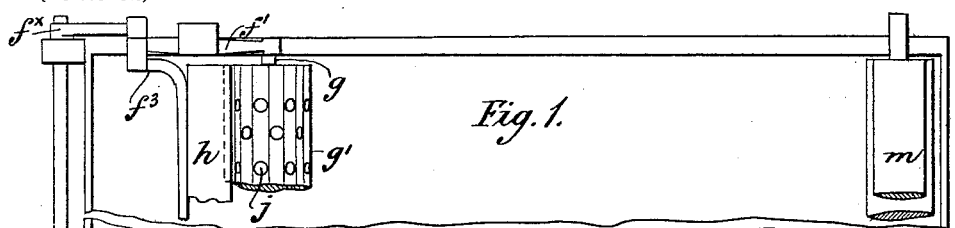
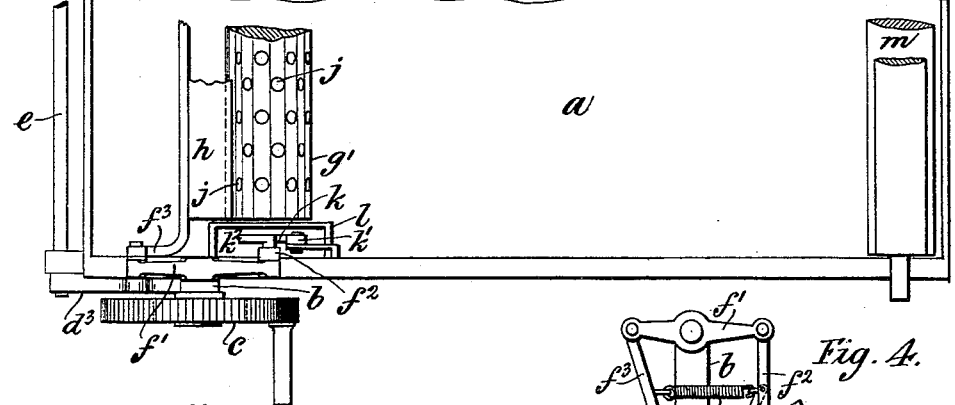
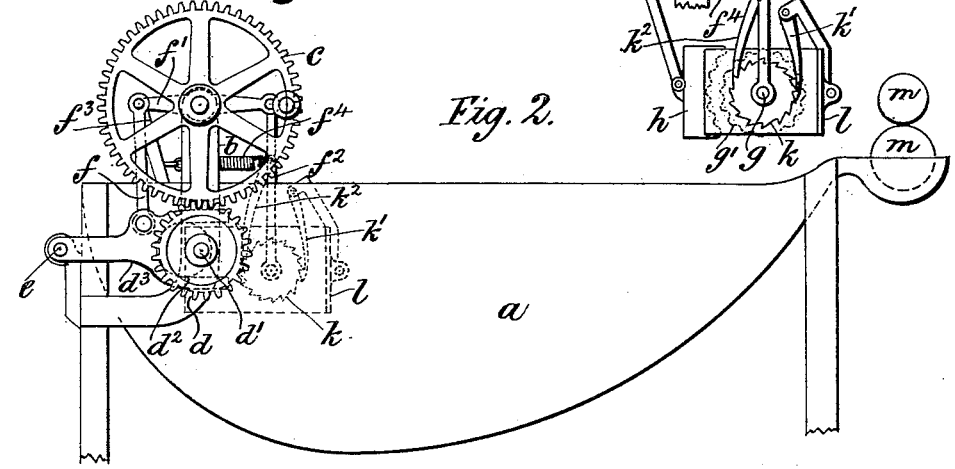
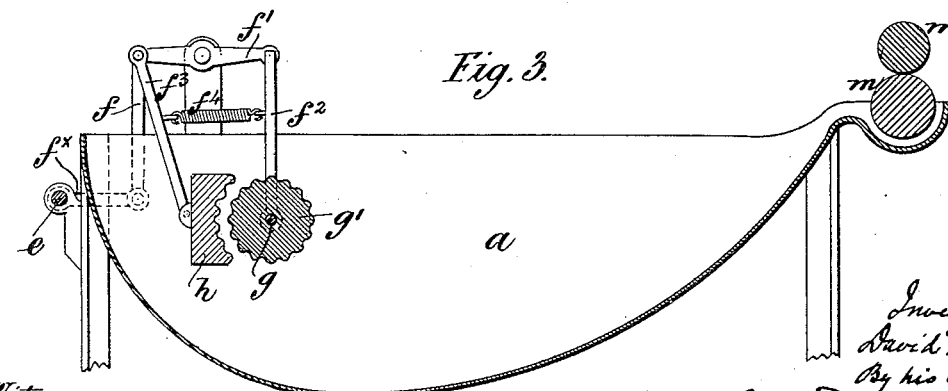
THE NORRIS PETERS CO., PHOTO-LITHO., WASHINGTON, D. C.

UNITED STATES PATENT OFFICE.

DAVID MORGAN, OF BRISTOL, ENGLAND.

WASHING-MACHINE.

SPECIFICATION forming part of Letters Patent No. 620,794, dated March 7, 1899.

Application filed August 25, 1898. Serial No. 689,488. (No model.)

*To all whom it may concern:*

Be it known that I, DAVID MORGAN, general smith and gas-fitter, a subject of the Queen of Great Britain, residing at 76 Broad Quay, Bristol, England, have invented a certain new and useful Washing-Machine, of which the following is a specification.

The object of this invention is to provide a machine for washing clothes and giving them the required rubbing and squeezing usually imparted by hand.

Figure 1 is a plan, Fig. 2 a side elevation, and Fig. 3 a longitudinal section, of a machine made according to my invention; and Fig. 4 shows part of the mechanism.

$a$ is a trough, of metal or wood, supported in any suitable manner. On one side of the trough is a bracket $b$, carrying a toothed hand-wheel $c$, gearing with a wheel $d$ on the spindle $d'$, carrying an eccentric or cam $d^2$, embraced by a forked lever $d^3$, fast with the shaft $e$, supported in bearings on the trough. The lever $d^3$ gives motion by means of the link $f$ to the rocking lever $f'$, fulcrumed to the bracket $b$. From the ends of this lever $f'$ depend two links $f^2 f^3$, connected the one to the axle $g$ of a roller $g'$ and the other to a rubber $h$ of the cross-section shown in Fig. 3. The roller and rubber are drawn together by the spring $f^4$, connecting the links, and are preferably fluted and covered with india-rubber or some similar substance and also provided with knobs or projections $j$ for the purpose of getting a grip of the clothes.

On the axle $g$ is a ratchet-wheel $k$, engaging with a ratchet $k'$, pivoted to the trough, while a detent $k^2$ is pivoted to the link $f^2$. It will be seen that each time the roller $g'$ descends owing to the rocking of the lever $f'$ it is turned one tooth by the ratchet $k'$, and it is prevented from turning during the upward movement by the detent $k^2$. In order to wash the clothes, it is only necessary for the attendant to insert one end between the roller and rubber and turn the hand-wheel, when the clothes are gradually drawn downward, being rubbed meantime between the rubber and roller.

It is usually well to surround the ratchet-wheel and parts gearing with it with a fence $l$ to keep the clothes from becoming entangled in it. The rocking lever $f'$ and links $f^2 f^3$ are duplicated on the other side of the machine, to which motion may be conveyed by the shaft $e$ and arm $f^\times$. At the farther end of the trough drying-rolls $m$ may be provided to squeeze out the larger part of the water from the clothes.

What I claim is—

1. The combination of a trough, a rubber, a roller, means for supporting the rubber and roller and for imparting both to the rubber and roller a to-and-fro movement in opposite directions, and means for giving at the same time a step-by-step rotation to the roller.

2. The combination of a washing-trough, a rubber and roller within the trough, means for supporting the rubber and roller, a spring for drawing the rubber and roller together, means for imparting to both the rubber and roller a to-and-fro movement in opposite directions, and means for rotating the roller.

3. The combination of a rubber, a roller, a rocking lever having arms provided with links by which the rubber and roller are carried, a spring for drawing the rubber and roller together, means for rocking the lever, and a ratchet-wheel and pawls for rotating the roller.

DAVID MORGAN.

Witnesses:
 EDWIN AUGUSTUS HART,
 R. O. COLEMAN.